US00RE38399E

(19) United States
(12) Reissued Patent
Montgomery

(10) Patent Number: US RE38,399 E
(45) Date of Reissued Patent: Jan. 27, 2004

(54) SAFETY CLOSURE AND CONTAINER

(75) Inventor: Gary V. Montgomery, Evansville, IN (US)

(73) Assignee: Rexam Medical Packaging Inc., Evansville, IN (US)

(21) Appl. No.: 10/205,971

(22) Filed: Jul. 15, 2002

Related U.S. Patent Documents

Reissue of:
(64) Patent No.: 6,102,223
Issued: Aug. 15, 2000
Appl. No.: 08/781,410
Filed: Jan. 10, 1997

(51) Int. Cl.[7] ..... B65D 55/02

(52) U.S. Cl. ..... 215/216; 215/44; 215/45; 215/218; 215/343; 215/330; 215/351; 220/281; 220/288; 220/DIG. 34

(58) Field of Search ..... 215/44, 45, 901, 215/216–218, 220, 329–331, 342–344, 351, 321, 252, 219, 221; 220/DIG. 34, 288, 281

(56) References Cited

U.S. PATENT DOCUMENTS

| | | | | |
|---|---|---|---|---|
| 2,752,060 A | | 6/1956 | Martin | |
| 3,450,289 A | | 6/1969 | Esposito, Jr. | |
| 3,608,763 A | | 9/1971 | Smith et al. | |
| 3,700,133 A | | 10/1972 | Bagguley | |
| 3,826,395 A | | 7/1974 | Montgomery | |
| 3,877,597 A | * | 4/1975 | Montgomery et al. | 215/221 |
| 3,894,647 A | * | 7/1975 | Montgomery | 215/221 X |
| 3,917,097 A | * | 11/1975 | Uhlig | 215/216 |
| 3,923,181 A | | 12/1975 | Libit | |
| 3,941,268 A | * | 3/1976 | Owens et al. | 215/216 |
| 4,213,534 A | * | 7/1980 | Montgomery | 215/216 |
| 4,280,631 A | * | 7/1981 | Lohrman | 215/330 X |
| 4,310,102 A | | 1/1982 | Walter | |
| 4,345,690 A | | 8/1982 | Hopley | |
| 4,351,443 A | | 9/1982 | Uhlig | |
| 4,375,858 A | | 3/1983 | Shah et al. | |
| 4,410,097 A | | 10/1983 | Kusz | |
| 4,437,578 A | | 3/1984 | Bienek et al. | |
| 4,579,239 A | | 4/1986 | Hart | |
| 4,610,372 A | | 9/1986 | Swartzbaugh | |
| 4,658,976 A | * | 4/1987 | Pohlenz | 215/252 |
| 4,667,836 A | * | 5/1987 | McLaren | 215/216 |

(List continued on next page.)

FOREIGN PATENT DOCUMENTS

| | | | |
|---|---|---|---|
| FR | 858575 | 11/1940 | 215/344 |
| FR | 1230375 | 9/1960 | 215/344 |
| FR | 2339539 | 8/1977 | |
| GB | 1073124 | 6/1967 | 215/344 |

*Primary Examiner*—Robin A. Hylton
(74) *Attorney, Agent, or Firm*—Charles G. Lamb; Middleton Reutlinger

(57) ABSTRACT

A child resistant cap including relatively thin threads which, when the cap is in a relaxed condition, are spaced from the bottle neck, said spacing permitting the cap to be squeezed inward at points on opposite sides of the cap so that the cap responds to the squeezing by expanding outward at points ninety degrees from the squeezing points so that stops on the cap at the cap expanding location will miss the stops normally engaged when in a relaxed condition, thereby permitting the cap to be removed from the bottle. The cap may also include a guide ring in the cap interior to guide the cap over the bottle neck to help ensure that the cap is centered on the bottle opening. The cap may include pressure pads on the cap skirt outside near the cap bottom showing the user where to press and stiffening the portion of the cap where pressure is to be applied. And, the cap may include a tamper indicating ring which will separate from the cap the first time the cap is removed from the bottle. Furthermore, in an alternative cap and bottle combination, an imaginary line connecting the cap threads and an imaginary line defined by the bottle neck will intersect at an angle of from one to eight degrees, thereby providing an increasing gap between the cap threads and the bottle neck as one gets further from the cap top, this angle creating non-vertical changes to the cap or the bottle or both.

21 Claims, 8 Drawing Sheets

U.S. PATENT DOCUMENTS 4,784,281 A * 11/1988 Rozenberg ..... 215/252
4,884,706 A * 12/1989 Julian ..... 215/252
4,913,299 A * 4/1990 Petro ..... 215/216 X
5,145,080 A 9/1992 Imbery, Jr.
5,285,913 A * 2/1994 Morton ..... 215/351 X
5,356,021 A * 10/1994 McBride et al. ..... 215/351 X
5,542,556 A * 8/1996 Ohmi et al. ..... 215/329
5,664,693 A * 9/1997 Krall ..... 215/221 X

* cited by examiner

SAFETY CLOSURE AND CONTAINER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a child resistant cap. The cap includes relatively thin threads which, when the cap is in a relaxed condition, are spaced from the bottle neck. This spacing permits the cap to be squeezed inward at points on opposite sides of the cap so that the cap responds to the squeezing by expanding outward at points ninety degrees from the squeezing points so that a lug on the cap at one or both of the cap expanding locations will miss the corresponding lug(s) normally engaged when in a relaxed condition, thereby permitting the cap to be removed from the bottle.

2. Discussion of the Prior Art

Caps, including child resistant caps, are known which taper outward from the top of the cap to the bottom of the cap, that is, caps which have the exterior geometric shape of the frustrum of a right circular cone. However, none of the known caps include inner cap threads which are relatively thin and which, when received on the bottle in a relaxed condition, provide for gaps between the threads and the bottle neck.

For example, U.S. Pat. No. 2,752,060 teaches a container closure, sloping outward from cap top to cap bottom, wherein the inner cap threads engage the bottle neck thread receiving grooves with only a non-functional gap therebetween. In molding caps, the threads typically have a draft of ¼° to ½° to permit easier removal of the tool forming the threads. That is, a line perpendicular to the cap top and a line touching the ends of the threads will have an angle of ¼° to ½° therebetween. Any gap left between the cap threads and the bottle neck because of molding with the draft of ¼° to ½° is a non-functional gap as related to the present invention, which involves a functional gap.

SUMMARY OF THE INVENTION

The present invention relates to a child resistant cap. The cap includes relatively thin threads which, when the cap is in a relaxed condition, are spaced from the bottle neck. This spacing permits the cap to be squeezed inward at points on opposite sides of the cap so that the cap responds to the squeezing by expanding outward at points ninety degrees from the squeezing points so that a lug on the cap at one or both of the cap expanding locations will miss the corresponding lug(s) normally engaged when in a relaxed condition, thereby permitting the cap to be removed from the bottle.

More particularly, the present invention comprises a child resistant cap for a bottle, the bottle having a neck portion and an adjacent opening, the neck portion having at least a first bottle lug extending outward therefrom, the neck portion having means for receiving a cap thread, the cap thread receiving means being positioned at a location nearer the adjacent opening than the bottle lug; the cap comprising: a cap top having a first diameter; a cap skirt extending from the cap top to a cap bottom; a cap interior portion, the interior portion having a threaded portion therein, the threaded portion being located toward the cap top; the threaded portion having at least one cap thread; the cap interior portion having at least a first cap lug, the cap lug being located toward the cap bottom; the cap being received on the bottle, the at least one cap thread being received by the cap thread receiving means; the first bottle lug and the first cap lug engagably preventing the cap from being removed from the bottle when the cap is in a relaxed condition, the at least one cap thread and the bottle neck portion having a gap therebetween, the gap having a first spacing; and, the cap being removed from the bottle by applying a pressure to the cap skirt at opposed pressure locations approximately transverse to the cap lug; the at least one cap thread thereby moving toward the bottle neck portion at the opposed pressure locations thereby reducing the first spacing, the cap threads thereby moving away from the bottle neck portion at the cap lug thereby enlarging the first spacing, thereby spacing the cap lug from the bottle lug permitting the cap to be removed from the bottle.

Further, the cap of the present invention can include a guide ring in the cap interior to guide the cap over the bottle neck to help ensure a proper fit. In the preferred embodiment, the bottom of the cap skirt has a second diameter greater than the cap top first diameter. However, with a guide ring, the cap can have approximately first and second diameters, so long as there is a sufficient spacing between the cap threads and the bottle neck to permit the cap to be squeezed and removed.

Also, the cap can include pressure pads on the cap skirt outside near the cap bottom showing the user where to press and stiffening the portion of the cap where pressure is to be applied. Finally, the cap can include a tamper indicating ring which will separate from the cap the first time the cap is removed from the bottle.

In an alternative cap and bottle combination, an imaginary line connecting the cap threads and an imaginary line defined by the bottle neck will intersect at an angle from one to eight degrees, thereby providing an increasing gap between the cap threads and the bottle neck as one gets further from the cap top. This angle can be created by non-vertical changes to the cap or the bottle or both.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figure 1:
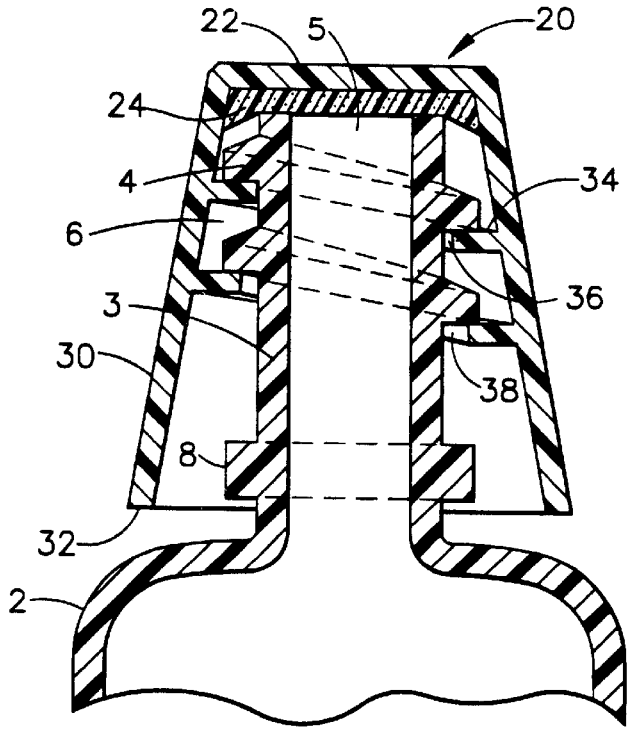
FIG. 1 is a sectional side view of the preferred cap and the neck portion of a bottle, the cap being in a relaxed condition.

With reference to FIGS. 1–8, a bottle 2 and a child resistant cap 20 receivable thereon are shown. Typically, cap 20 is a molded polyethylene or polypropylene.

Bottle 2 includes a neck portion 3 having an adjacent opening 5 therein. Bottle threads 4, shown, for example, as a single helix, are on the upper portion of neck portion 3. Bottle threads 4 are spiral shaped and circumscribe bottle 2 at least completely and, more typically, make at least two circumscriptions of bottle 2. Other thread configurations are known in this industry and could be employed with the instant invention. For example, a double helix (or double start threads) could be employed where a pair of threads are used starting on opposite sides of the bottle. Between bottle threads 4 is the thread receiving grooves 6 which will receive the cap threads 34. Cap threads 34 engage the bottom side of bottle threads 4. The cap and bottle would employ matching thread configurations, single helix, double helix, or other.

Bottle 2 has a horizontal ring 8 therearound. Ring 8 has opposed bottle ring lugs 10 extending outward therefrom which will engage opposed cap lugs 40 to make the cap resistant to removal from the bottle.

Cap 20 has a top 22 and a cap skirt 30 tapering outward from the top 22 of the cap to the bottom 32 of the cap, that is, cap 20 has the geometric shape of the frustrum of a right circular cone. Cap top 22 has a top diameter of $d_1$ and cap bottom 32 has a diameter of $d_2$, with $d_2>d_1$.

Looking into the inside cap 20, a seal 24 is attached within the cap 20 adjacent cap top 22. Toward cap top 22 are relatively thin threads 34, for example having a thread width of approximately 0.030 inch (0.076 cm). This thread "thinness" minimizes the stiffening effect of the threads 34 on the flexibility of the cap skirt 30, permitting the cap to more readily deform when pressure is applied thereto, as is explained hereinafter.

Preferably, threads 34 extend from the cap skirt 30 such that they are parallel two cap top 22. However, threads 34 may be angled with respect to top 22. In fact, threads 34 could extend transverse to skirt 30. The width of threads 34 is less than the width of mating bottle groove 6, preferably less than one-half the width. As one goes from the portion of the threads 34 toward the top 22 toward the cap bottom 32, the threads may become longer, that is, may extend further from cap skirt 30. With the outward taper of the cap skirt 30, this would help the threads 34 engage the mating bottle groove 6. However, as shown, threads 34 are of uniform length.

With this cap 20, a line perpendicular to the cap top 22 and a line touching the ends of the threads 34 will have an angle of at least 1° therebetween. This angle can be as much as 8°, but I believe that about 3½° is an optimum angle. Some geometric presentations of various threads, skirts, and bottle neck configurations are shown in FIGS. 12a–12d and discussed hereinafter.

When cap 20 is received on bottle 2, there is a functional gap between the ends of the threads 34 and the neck 3 of bottle 2. As seen in FIG. 1, on the right side of the bottle and cap, the upper thread 34 leaves a gap 36 between the thread 34 and neck 3 of distance $d_3$. The lower thread 34 leaves a gap 36 between the thread 34 and neck 3 of distance $d_4$, with $d_4>d_3$.

Figure 2:
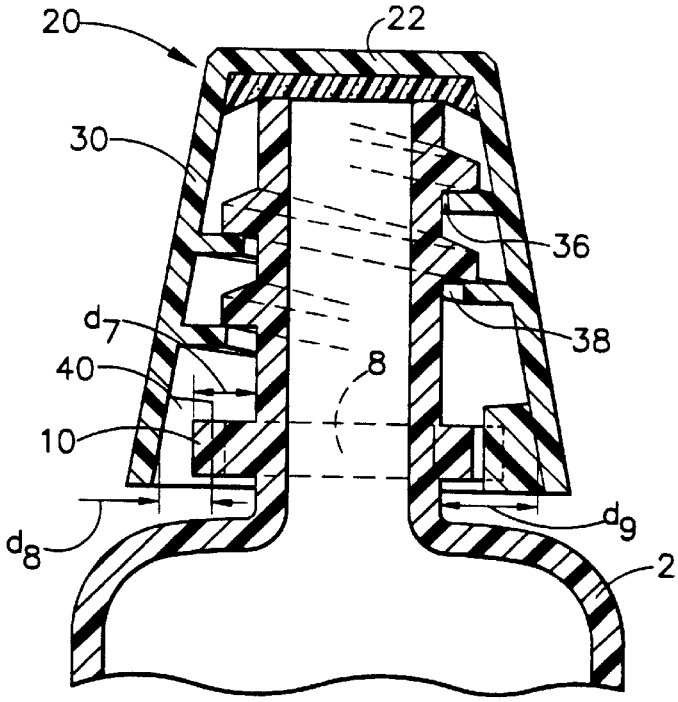
FIG. 2 is a sectional side view of the preferred cap and the neck portion of a bottle ninety degrees from the view of FIG. 1, the cap being in a relaxed condition.

FIGS. 1 and 2 show the cap 20 in a relaxed condition. FIG. 1 shows the section view at the location where pressure will be applied to remove the cap 20 from bottle 2 and FIG. 2 is ninety degrees from FIG. 1. Looking from the top down, it is assumed that cap 20 is threaded onto bottle 2 with a clockwise rotation and removed from bottle 2 with a counterclockwise rotation. The bottle ring lugs 10 extend from the bottle neck 3 a distance $d_7$, the combined distance of ring 8 and lug 10 from neck 3. Cap lugs 40 extend inward a distance $d_8$ from cap skirt 30. At the location where the lugs 10/40 are located, the inside of the cap skirt 30 is a distance $d_9$ from the bottle neck 3. With cap 20 in the relaxed condition, lugs 10/40 are engageable, with $d_9<d_7+d_8$, such that the cap 20 is not readily removable from bottle 2.

Lugs 10/40 can be of a variety of configuration. As shown, they extend outward from bottle neck 3 and inward from cap skirt 30. However, they can be non-radial and extend from bottle neck 3 and cap skirt 30 away from the direction of rotation, typically clockwise, to put the cap 20 on the bottle 2. This makes it easier to put the cap 20 on the bottle 2, as, when they engage, the lugs 10/40 are eased toward the cap and the bottle, or make it easy for the cap to deform permitting lugs 40 to pass over lugs 10, when placing the cap on the bottle; and, without proper pressure on the cap 20, the lugs 10/40 try to interlock when trying to remove the cap from the bottle.

Figure 3:
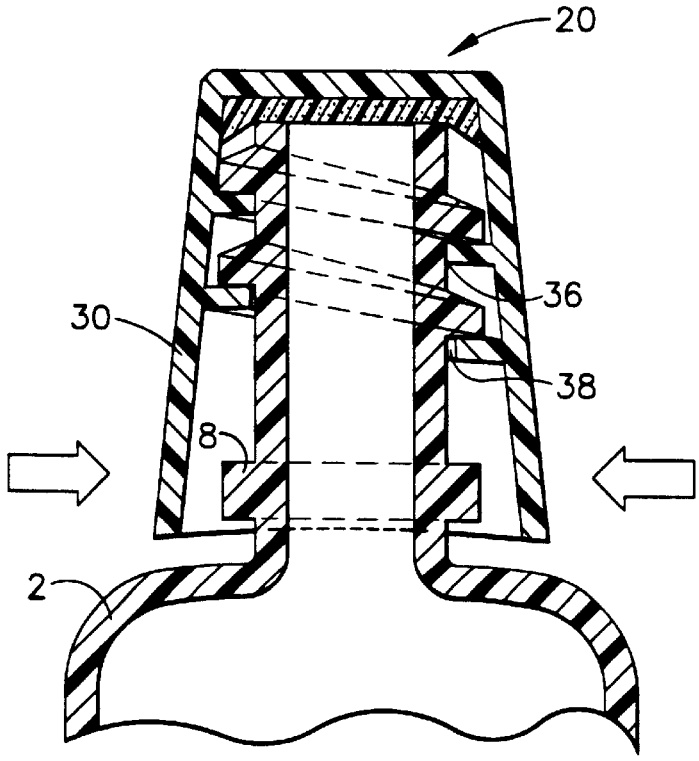
FIG. 3 is the sectional view of FIG. 1 with pressure being applied to the cap.
Figure 4:
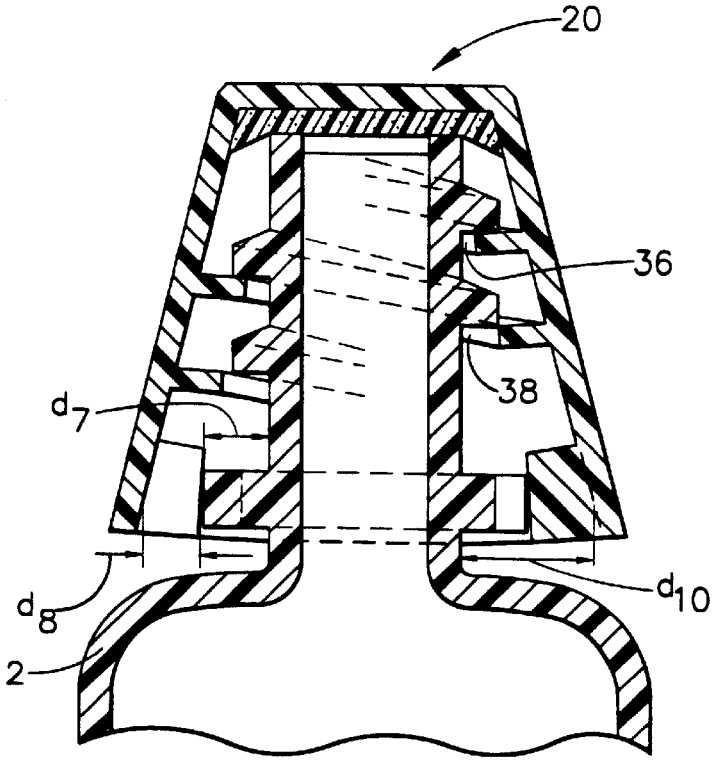
FIG. 4 is the sectional view of FIG. 2 with pressure being applied to the cap.
Figure 5:
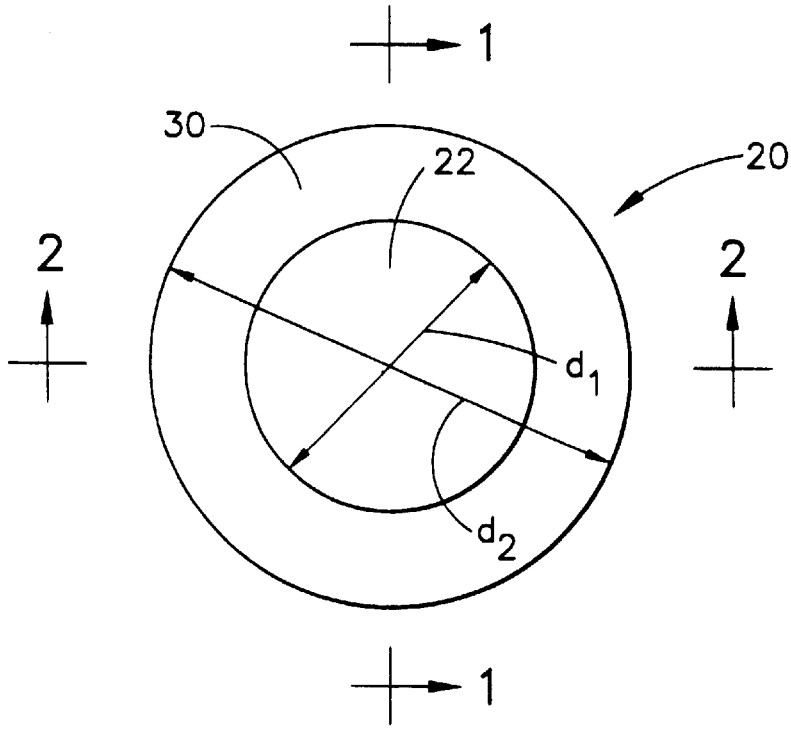
FIG. 5 is a top view of the cap in a relaxed condition, with section lines identifying the views of FIGS. 1 and 2.
Figure 6:
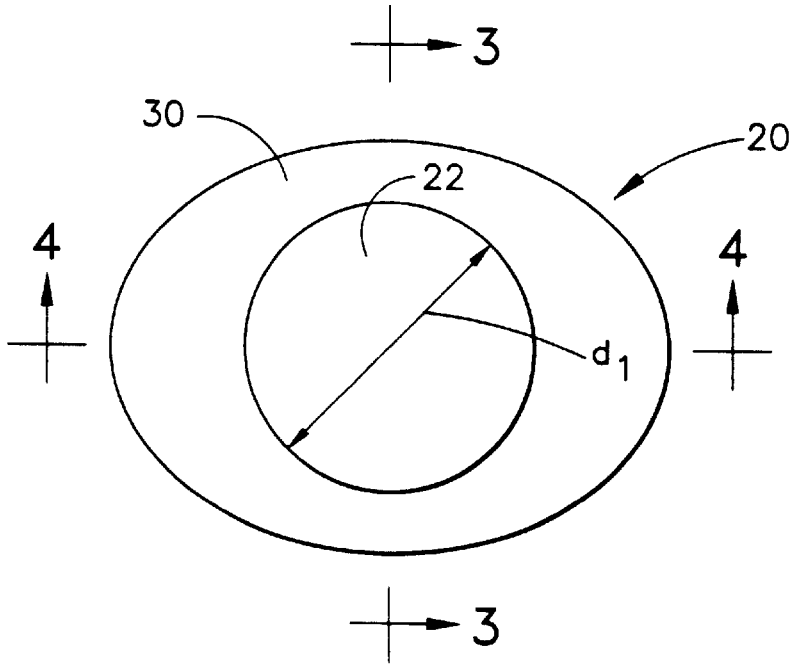
FIG. 6 is a top view of the cap with pressure being applied thereto, with section lines identifying the views of FIGS. 3 and 4.
Figure 7:
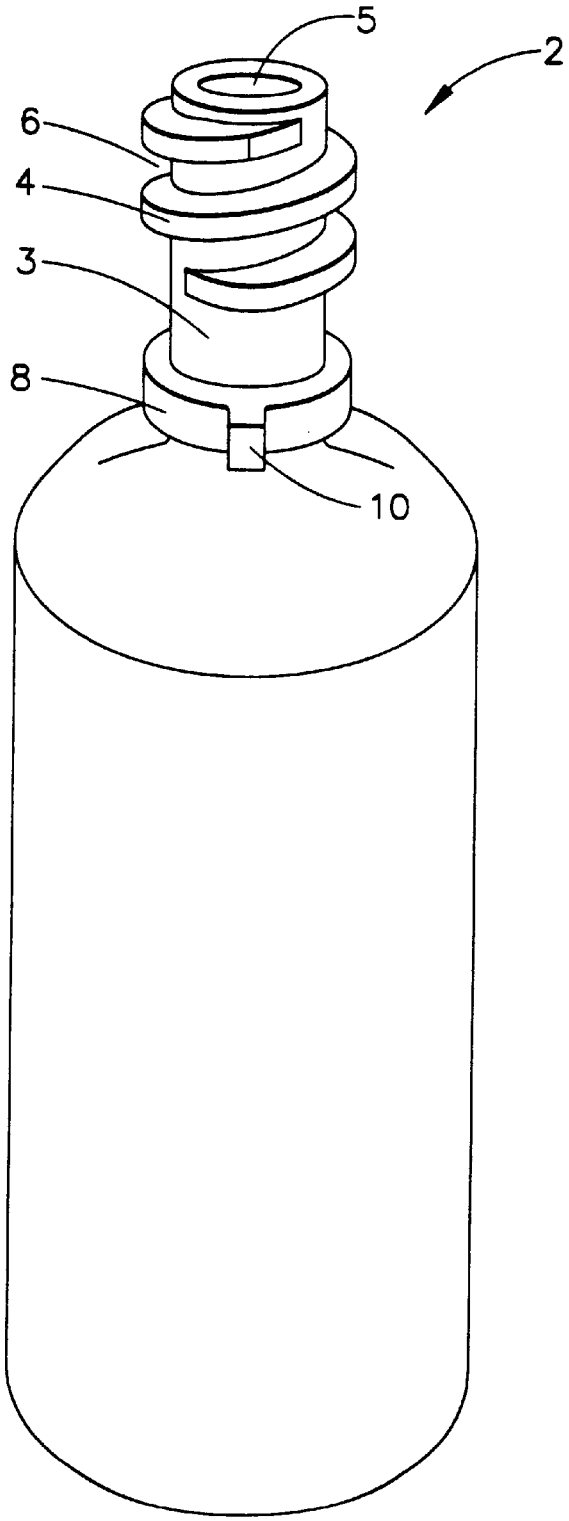
FIG. 7 is a perspective view of the bottle for receiving the cap of the preferred embodiment.
Figure 8:
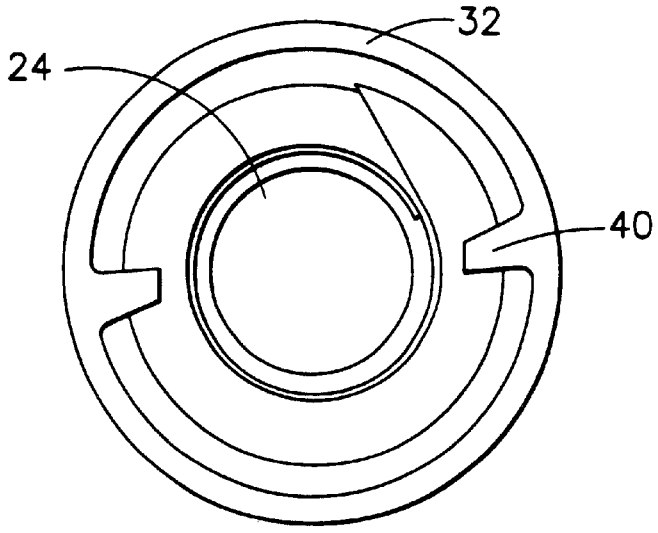
FIG. 8 is a bottom view of the cap of FIG. 1.

FIGS. 3 and 4 mirror FIGS. 1 and 2, respectively, except that in FIGS. 1 and 2 the cap 20 is in its relaxed condition and in FIGS. 3 and 4 the cap 20 has pressure exerted on the cap skirt 30 on opposed sides. Pressure is placed on the sides of cap skirt 30 at the sides shown in FIG. 3. At this location, gap 36 between thread 34 and neck 3 lessens from the distance $d_3$ to the distance $d_5$ and gap 38 lessens from the distance $d_4$ to the distance $d_6$. When pressure is placed on the cap skirt 30 at the location of FIG. 3, the cap skirt 30 at locations about ninety degrees from the pressure locations, as shown in FIG. 4, where the lugs 40 are located, expands outward. This is seen in the top down oval view of FIG. 6, as compared to the relaxed condition circular view of FIG. 5. At the location of FIG. 4, gap 36 between thread 34 and neck 3 widens from the distance $d_3$ to the distance $d_{11}$ and gap 38 widens from the distance $d_4$ to the distance $d_{12}$. Further, at the location where the lugs 10/40 are located, the inside of the cap skirt 30 is a distance $d_{10}$ from the bottom neck 3, $d_{10}>d_9$, and $d_{10}>d_7+d_8$, such that the cap 20 can be readily removable from bottle 2.

Figure 9:
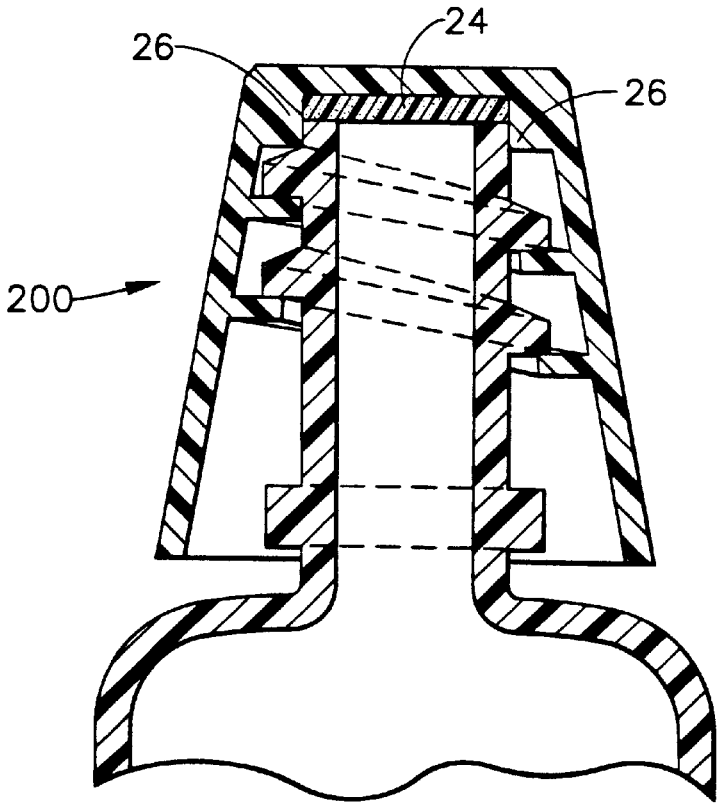
FIG. 9 is a sectional side view of a first alternative cap and the neck portion of a bottle, the cap having a guide ring, the cap being in a relaxed condition.

With reference to the first alternative embodiment of FIG. 9, cap 200 is shown having an inner guide ring 26 toward the cap top 22. Seal 24 is received within ring 26. Ring 26 is sized to fit over bottle neck portion 3 near adjacent opening 5, seal 24 providing a fluid seal between the cap 200 and bottle 2. Guide ring 26 helps ensure that cap 200 will properly fit or center on opening 5 of bottle 2.

Figure 10:
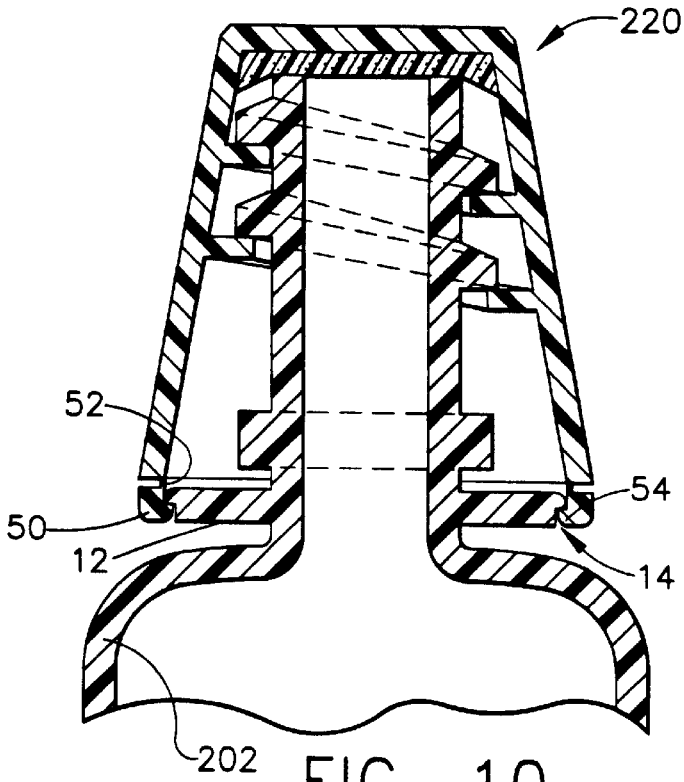
FIG. 10 is a sectional side view of a second alternative cap and the neck portion of a bottle, the cap having a tamper indicating break away ring, the cap being in a relaxed condition.

With reference to the second alternative embodiment of FIG. 10, cap 220 is shown being received by bottle 202. Bottle 202 differs from bottle 2, in that bottle 202 has a tamper indicating ring 12 circumscribing bottle 202 at a location more distant from opening 5 than bottle ring 8. The lower portion of tamper indicating ring 12 has an indented groove portion 14. Cap 220 has a tamper indicating ring 50 attached thereto at the cap bottom 32 by a frangible web 52. Tamper indicating ring 50 has an inturned collar 54. When cap 220 is received on bottle 202, collar 54 is received by groove 14. When cap 220 is removed from bottle 202 for the first time, frangible web 52 breaks separating tamper indicating ring 50 and cap 220, thereby identifying to the user that the cap has been at least once removed or tampered with.

Figure 11:
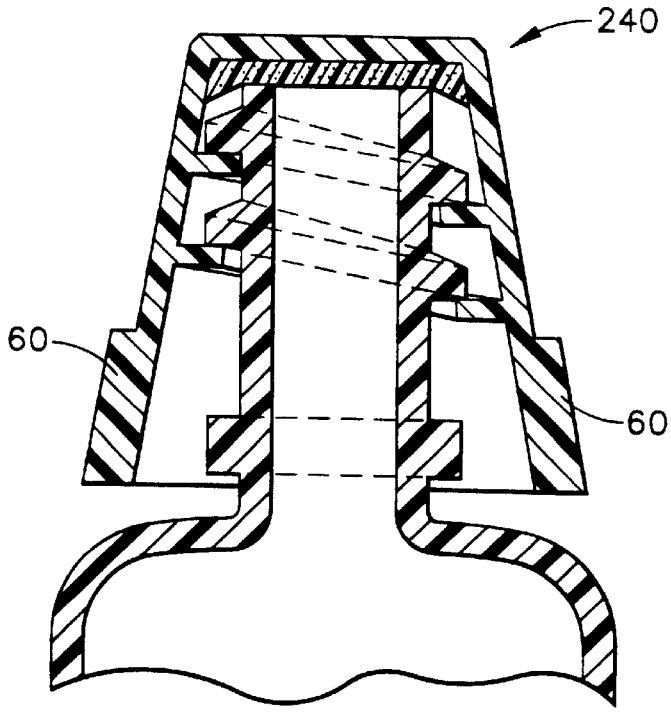
FIG. 11 is a sectional side view of a third alternative cap and the neck portion of a bottle, the cap having opposed pressure pads, the cap being in a relaxed condition.

With reference to the third alternative embodiment of FIG. 11, cap 240 is shown in the relaxed condition at the locations where pressure is to be applied to the cap skirt 30. Pressure pads 60 are included on the outside of cap skirt 30 at these pressure locations. This thickening of the cap skirt 30 at the pressure locations will help the cap skirt 30 deform at the locations ninety degrees therefrom to make it easier to remove the cap 240 from the bottle.

As a further alternative, the present invention can be implemented by having known threads in the cap, that is threads with a draft angle of ¼° to ½° and having the bottle neck or bottle threads have an outward slope angle as you near the opening of 1° to 8° to create the desired functional gap between the cap threads and the bottle. Or, a combination of cap thread angle and bottle outward slope summing to 1° to 8° may be employed. With this combination, neither the cap threads or the bottle neck is "vertical".

Examples of this are shown in FIGS. 12a–12d. The letter "h" represents a horizontal line, or a line parallel the cap top 22. The letter "a" designates a line representing the cap skirt 30. The letter "b" designates a line which would connect the inner ends of the cap threads 34. The letter "c" represents a line parallel the bottle neck 3. The angle "α" between lines b and c shows how the gap between the threads 34 and the neck 3 increases as you get further from cap top 22 and bottle opening 5. For these examples, α is approximately 5°, although, as has been previously discussed, it is believed that $1° \leqq \alpha \leqq 8°$ is desirable, with $\alpha \approx 3\frac{1}{2}°$ preferable.

Figure 12A:
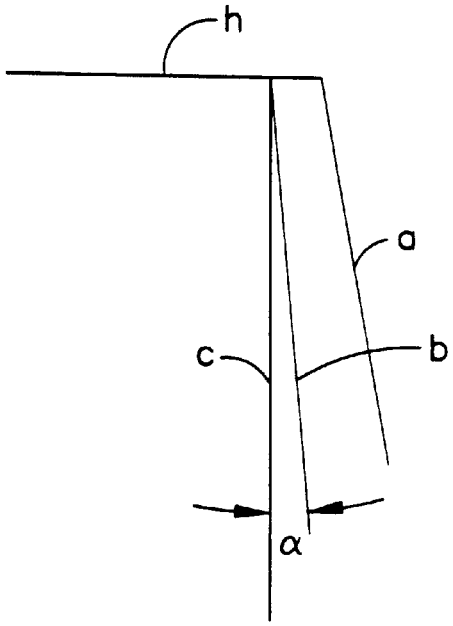
FIGS. 12a–12d are geometric representations of cap/bottle alignments showing angle between an imaginary line connecting the ends of the cap threads and an imaginary line parallel the bottle neck.
Figure 12B:
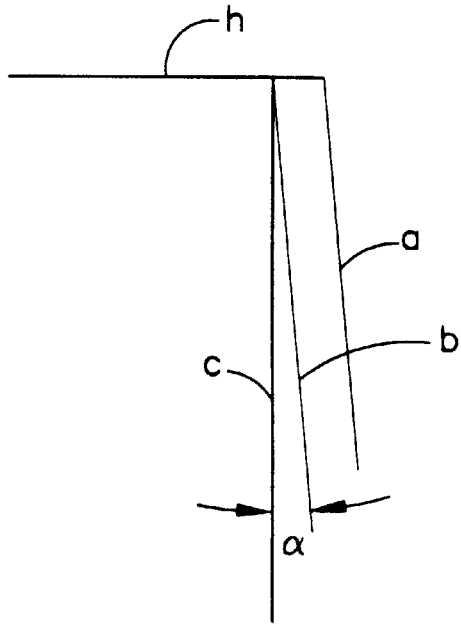

In FIG. 12a, cap skirt 30[,]a, has a 10° angle from vertical, line b has a 5° angle from vertical, and bottle neck 3[,]c, has a 0° *angle* from vertical. Therefore, α=5°. In FIG. 12b, a and b are 5° from vertical and c is 0° from vertical, so α=5°.

Figure 12C:
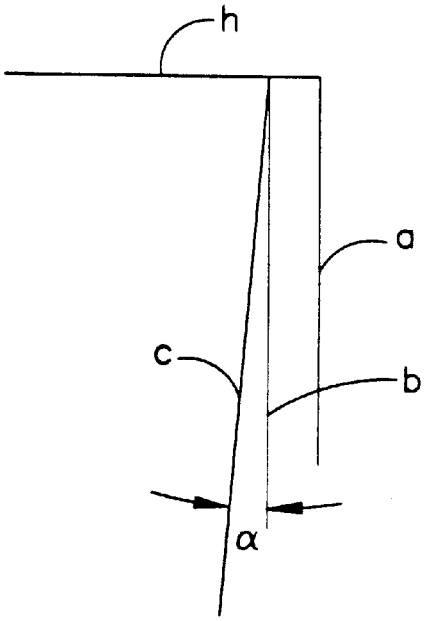
Figure 12D:
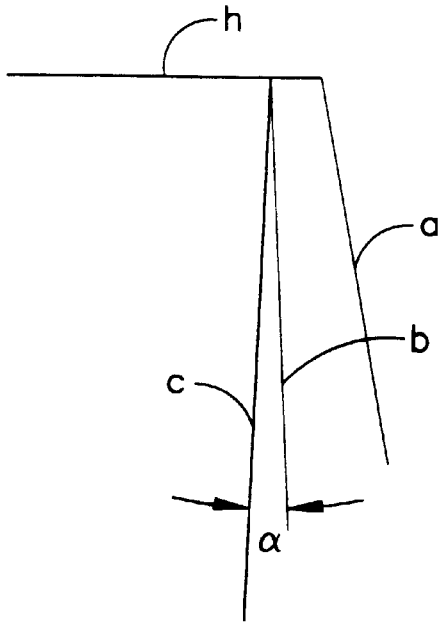

FIG. 12c shows how the cap would have a and b being 0° from vertical and the bottle having c of −5° from vertical, so α=5°. With the example of FIG. 12d, neither the cap threads or neck are vertical. With this example, a is 10° from vertical, b is 2½° from vertical, c is −2½° from vertical, so α=5°. These examples of FIGS. 12a–12d merely show some of the combinations possible. Any combination having $1° \leqq \alpha \leqq 8°$ will provide a proper functioning gap so that a cap can be removed from the bottle.

Figure 13:
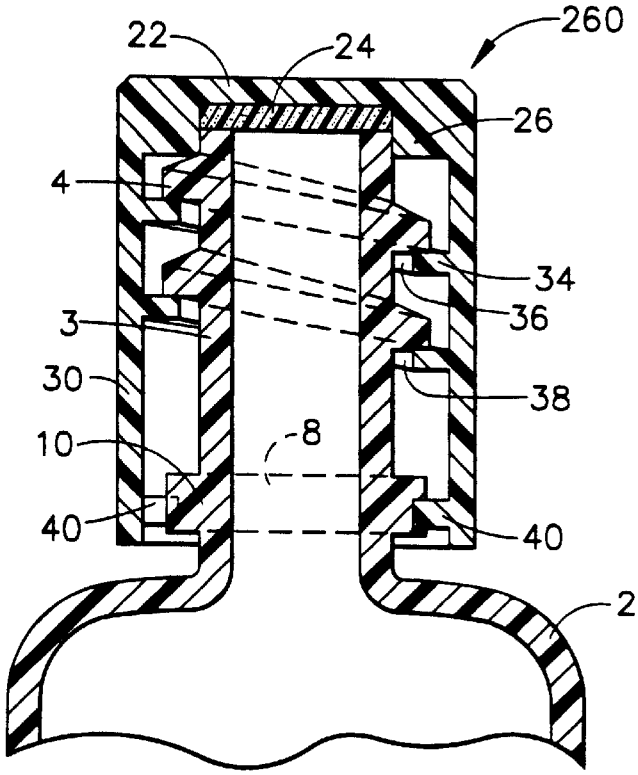
FIG. 13 is a sectional side view of a fourth alternative cap and the neck portion of a bottle, the cap having approximately identical top and bottom diameters, the cap being in a relaxed condition; and, FIG. 14 is a sectional view of FIG. 13 with pressure being applied to the cap.
Figure 14:
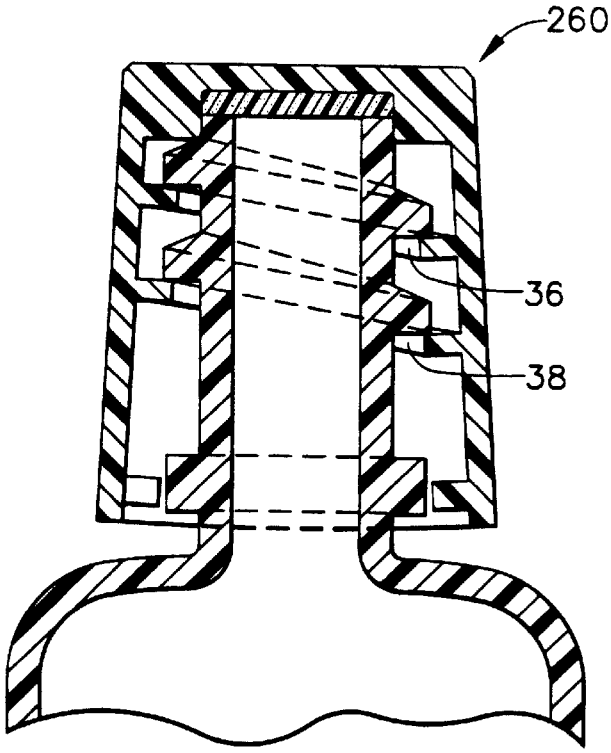

Even further, an additional embodiment is shown in FIGS. 13 and 14. Cap 260 includes a guide ring 26 and a seal 24'. As was stated with the description of cap 200 in FIG. 9, guide ring 26 helps ensure that cap 200 will properly fit or center on opening 5 of bottle 2. The same holds true for cap 260. With ring 26 centering cap 260 on opening 5, cap 260 can have cap threads 34 spaced further from bottle neck 3 toward the cap top 22 than with the previous embodiments. Therefore, as shown in FIG. 13, gaps 36 and 38 are approximately equal and cap skirt 30 is generally cylindrical in shape.

Cap 260 can be removed from bottle 2 in the same manner as with the earlier cap embodiments. As seen in FIG. 13, in the relaxed condition, a bottle lug 10 and a cap lug 40 engage. When pressure is applied to cap 260 at about locations transverse to the view of FIGS. 13 and 14, cap 260 deforms as seen in FIG. 14. As is seen, a lug 40 can pass a bottle lug 10 thereby permitting the cap thread 34 of the cap 260 to be unthreaded from bottle thread 4 and removal of the cap 260 from bottle 2.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. A child resistant cap and bottle combination comprising:

a bottle having a neck portion and an adjacent opening, the neck portion having at least a first bottle lug extending outward therefrom, the neck portion having an [interior] *exterior* bottle thread for receiving a cap thread, the bottle thread being positioned at a location nearer the adjacent opening than the bottle lug;

the cap comprising:

a. a cap top having a first diameter;

b. a cap skirt having an inner surface and extending from said cap top to a cap bottom, said cap bottom having a second diameter greater than said cap top first diameter;

c. said cap skirt inner surface having a threaded portion therein, said threaded portion being located toward said cap top, said threaded portion having at least one cap thread, said cap inner surface having at least a first cap lug, said cap lug being located toward said cap bottom;

d. said cap being received on the bottle, said at least one cap thread being received by the bottle thread, the first bottle lug and the first cap lug engagably preventing said cap from being removed from the bottle when said cap is in a relaxed condition, said at least one cap thread having an innermost extent in spaced relation with the bottle neck portion, said bottle thread having an outermost extent in spaced relation with said cap skirt, said spaced relation between said outermost extent of said bottle thread increasing from top to bottom of said inner surface of said cap skirt in said relaxed condition, said cap being removable from the bottle by applying pressure to said cap skirt at opposed pressure locations approximately transverse to said cap lug whereby said at least one cap thread moves toward the bottle neck portion at said opposed pressure locations thereby reducing said spacing, said cap thread thereby moving away from the bottle neck portion at said cap lug thereby enlarging said spacing, thereby spacing said cap lug from the bottle lug.

2. The child resistant cap and bottle combination of claim 1, said at least one cap thread being parallel to said cap top.

3. The child resistant cap and bottle combination of claim 2 where the cap thread receiving means is a groove having a groove width and said at least one cap thread has a thread width, said thread width being less than the groove width.

4. The child resistant cap and bottle combination of claim 3, said thread width being less than one-half the groove width.

5. The child resistant cap and bottle combination of claim 3, said thread width being approximately equal 0.03 inch.

6. The child resistant cap and bottle combination of claim 1, said cap interior portion having a seal therein, said seal being adjacent said cap top and engaging the bottle opening when said cap is received on the bottle.

7. The child resistant cap and bottle combination of claim 1, said cap interior portion having a guide ring therein, said guide ring being adjacent said cap top, said guide ring fitting over the bottle neck portion at said adjacent opening when said cap is received on the bottle.

8. The child resistant cap and bottle combination of claim 7, said cap interior portion having a seal therein, said seal being adjacent said cap top within said guide ring and engaging the bottle opening when said cap is received on the bottle.

9. The child resistant cap and bottle combination of claim 1, said cap skirt having opposed outward pressure pads at said opposed pressure locations toward said cap bottom.

10. The child resistant cap and bottle combination of claim 1, the bottle having a tamper indicating ring therearound, said cap having a break away ring attached to said cap bottom, said break away ring having an in turned collar to be received by the tamper indicating ring when said cap is received on the bottle, the tamper indicating ring causing said break away ring to separate from said cap when said cap is removed from the bottle the first time.

11. The child resistant cap and bottle combination of claim 1, said at least one cap thread having inner ends, said threaded portion having a first imaginary line connecting said inner ends, said cap top having a second imaginary line transverse to said cap top, said first imaginary line and said second imaginary line having an intersection angle therebetween of at least one degree.

12. The child resistant cap of claim 11, said intersection angle being not more than eight degrees.

13. The child resistant cap of claim 11, said intersection angle being approximately 3½ degrees.

14. The combination of claim 1, said bottle neck portion having a top diameter equal to a bottom diameter.

15. The combination of claim 1 wherein said cap threads includes first threads and first grooves and said cap thread receiving means include second threads and second grooves whereby in said relaxed condition, said first threads are spaced from said second grooves and said second threads are spaced from said firsts grooves.

16. A child resistant cap and bottle combination, comprising:

a. a bottle having a neck portion and an adjacent opening, said neck portion having an exterior bottle thread for receiving a cap thread, said bottle thread having an outermost extent and a first imaginary line connecting said outermost extent extending substantially parallel to said bottle neck portion;

b. a cap having:
(1) a cap top;
(2) a cap skirt having an inner surface and extending from said cap top to a cap bottom; and
(3) said cap skirt inner surface having a threaded portion therein; said threaded portion having at least one cap thread, said at least one cap thread having an innermost extent, said threaded portion having a second imaginary line connecting said innermost extent extending substantially perpendicular to said cap top, said first imaginary line and said second imaginary line having an intersection angle therebetween of at least one degree; and, c. said cap and said bottle having engageable means for preventing said cap from being removed from said bottle when said cap is in a relaxed condition, said cap thread innermost extent being in spaced relation with said bottle neck portion and said bottle thread outermost extent being in spaced relation with said inner surface of said cap skirt, said spaced relation between said outermost extent of said bottle thread increasing from top to bottom of said inner surface of said cap skirt in said relaxed condition.

17. The child resistant cap and bottle combination of claim 16, said intersection angle being not more than eight degrees.

18. The child resistant cap and bottle combination of claim 16, said intersection angle being approximately 3½ degrees.

19. The child resistant cap and bottle combination of claim 16, where said first imaginary line and a line transverse to said cap top have an angle therebetween of not more than ½ degrees.

20. The child resistant cap and bottle combination of claim 16, where said second imaginary line and a line transverse to said cap top have an angle therebetween of not more than ½ degrees.

21. The combination of claim 16 wherein said cap threads include first threads and first grooves and said cap thread receiving means include second threads and second grooves whereby in a relaxed condition, said first threads are spaced from said second grooves and said second threads are spaced from said first grooves.

* * * * *